United States Patent [19]

Nanyoshi et al.

[11] Patent Number: 4,930,477

[45] Date of Patent: Jun. 5, 1990

[54] SYSTEM AND METHOD FOR CONTROLLING IGNITION TIMING FOR INTERNAL COMBUSTION ENGINE

[75] Inventors: Yasutoshi Nanyoshi, Hyogo; Toshio Matsumura, Kanagawa; Tatsuo Morita, Kanagawa; Hidetoshi Shigyo, Kanagawa, all of Japan

[73] Assignee: Nissan Motor Company, Limited, Japan

[21] Appl. No.: 258,685

[22] Filed: Oct. 17, 1988

[30] Foreign Application Priority Data

Oct. 15, 1987 [JP] Japan ................... 62-260990

[51] Int. Cl.$^5$ ............................... F02P 5/04
[52] U.S. Cl. .................... 123/422; 123/416; 364/431.05
[58] Field of Search ............... 123/422, 425, 427, 416, 123/417, 435, 418; 364/431.05

[56] References Cited

U.S. PATENT DOCUMENTS

| | | | |
|---|---|---|---|
| 4,458,646 | 7/1984 | Suzuki et al. | 123/425 |
| 4,570,594 | 2/1986 | Egami et al. | 123/422 |
| 4,596,217 | 6/1986 | Bonitz et al. | 123/422 |
| 4,626,997 | 12/1986 | Takeda et al. | 364/431.05 |
| 4,658,787 | 4/1987 | Takizawa | 123/418 |
| 4,697,563 | 10/1987 | Beekar et al. | 123/422 |
| 4,732,125 | 3/1988 | Takizawa | 123/422 |
| 4,745,901 | 5/1988 | Reifenberger et al. | 123/416 |
| 4,747,383 | 5/1988 | Kimura et al. | 123/422 |
| 4,790,280 | 12/1988 | Uwchara et al. | 123/422 |
| 4,790,281 | 12/1988 | Uriano et al. | 123/425 |
| 4,803,967 | 2/1989 | Ohkung | 123/422 |
| 4,819,599 | 4/1989 | Chemnitzer | 123/425 |

Primary Examiner—Raymond A. Nelli
Attorney, Agent, or Firm—Lowe, Price, Leblanc, Becker & Shur

[57] ABSTRACT

A system and method for controlling an ignition timing for an internal combustion engine mounted in a vehicle are disclosed in which a limit value for the ignition timing value is provided so that a difference between a current ignition timing and a previous ignition timing is within the limit value and the limit value is set according to a magnitude of an engine acceleration. For example, when an abrupt engine acceleration occurs, the limit value is set to 15 degrees. When the engine is in a steady state (no abrupt acceleration from an idling condition), the limit value is set to four degrees. Therefore, no vehicle body shock occurs due to the abrupt change in an engine output torque caused by the abrupt change in the ignition timing and a response characteristic of a rise in the engine output torque during the abrupt acceleration can be assured.

13 Claims, 3 Drawing Sheets

4,930,477

SYSTEM AND METHOD FOR CONTROLLING IGNITION TIMING FOR INTERNAL COMBUSTION ENGINE

BACKGROUND OF THE INVENTION (1) Field of the invention

The present invention relates to a system and method for controlling an ignition timing for an internal combustion engine applicable to the internal combustion engine mounted in a vehicle in which a limit value for limiting a difference between a current ignition timing and previous ignition timing values is set according to a acceleration condition of the vehicular engine.

(2) Background of the art

In general, a required ignition timing at which each spark plug ignites and burns air-fuel mixture supplied to a corresponding cylinder is different according to a driving condition of a vehicular engine.

Japanese Patent Application First publications (Unexamined) No. sho 55-139971 published on Nov. 1, 1980 and No. sho 60-162059 published on Aug. 23, 1985 exemplify ignition timing control systems for the vehicular engine.

In the above-identified Japanese Patent Application Publications, calculation equations or table maps are prepared to derive respective basic ignition timings. The equations or tables are mutually different and are selected according to engine driving conditions, such as cranking conditions, no load conditions (idling conditions), load conditions, etc. Therefore, the engine driveability and stability can be improved for each driving condition.

In more details, the ignition timing at the time of no-load condition is set toward a retard angle side according to an engine coolant temperature and engine speed to achieve a stability of a number of engine revolutions per time (engine speed) during engine idling condition. On the contrary, the ignition timing at the time of normal load condition is set toward an advance angle side to achieve a high engine output torque and high engine combustion efficiency. Particularly, as the engine load becomes low (light), an optimum ignition timing is set toward a considerably advance angle side since under such a low load condition a combustion of air-fuel mixture supplied to the engine takes place later than a normal combustion, a large stepwise difference exists between the ignition timing at the time of engine idling and that at the time of a low load condition in a vicinity of the idling condition. Consequently, when the vehicle runs during the light engine load condition in the vicinity of the idling condition, a slight variation of loads (a change in an opening angle of an engine throttle valve) causes an abrupt change in the ignition timing and an abrupt change in an engine output torque, thus generating a vehicle jolting. Therefore, a steering operability of the vehicle can be reduced.

To prevent such a step difference in the ignition timing as described above, one of the ignition timing controlling systems has been proposed in a Japanese Patent Application First Publication No. Sho 54-72326 published on June 9, 1979.

In the Japanese Patent Application First Publication No. sho 54-72326, a limit value is provided in an ignition timing angle so that the ignition timing is changed abruptly at one time such that a width of the change in the ignition timing angle exceeds a predetermined angular displacement (i.e., a difference between the current ignition timing and previous ignition timing is below a predetermined value), in order to prevent the engine stability from damage due to a large change in the engine output torque caused by the abrupt change in the ignition timing. The limit value is set smaller.

However, the previously proposed ignition timing system disclosed in the above-identified Japanese Patent Application Publication No. sho 54-723326 has a problem to be described below.

That is to say, since the limit value is set smaller to prevent the abrupt change in the engine output torque and to improve the engine stability, the ignition timing cannot follow the change in engine load at the time of an abrupt acceleration and then a response characteristic of a rise in the engine output torque becomes reduced. On the contrary, when an importance is placed on the response characteristic to avoid such a trouble, the limit value needs to be set larger. Therefore, a difficulty of setting the fixed limit value exits and the stepwise difference in the ignition timing angles between those at the time of engine idling and light load condition in the vicinity of the engine idling still remains. Consequently, a vehicle shock such as the jolting due to the abrupt change in the engine output torque reduces the vehicle steering operability.

SUMMARY OF THE INVENTION

It is an object of the present invention to provide a system and method for controlling an ignition timing for a vehicular engine which improves a vehicle steering operability and driveability without jolting due to the abrupt change in an engine output torque caused by an abrupt change in the ignition timing and without sacrifice of the response characteristic of the rise in an engine output torque during an abrupt acceleration.

The above-described object can be achieved by providing a system for controlling an ignition timing for an internal combustion engine, comprising: (a) first means for detecting an engine operating condition; (b) second means for detecting whether an engine acceleration exceeding a predetermined value occurs; (c) third means for setting an ignition timing value according to the detected engine operating condition; (d) fourth means for setting a limit value to limit a difference between a current ignition timing value and a previous ignition timing value according to a result of detection by means of the second means; (e) fifth means for providing a limit for the current ignition timing value so that the difference is within the limit value and setting the current ignition timing value; (f) sixth means for storing the current ignition timing value set by the fifth means therein as the previous ignition timing value; and (g) seventh means for igniting air-fuel mixture supplied to each engine cylinder at a timing whose value is determined by the fifth means.

The above-described object can also be achieved by providing a system for controlling an ignition timing for an internal combustion engine, comprising: (a) first means for detecting an engine operating condition; (b) second means for detecting an engine acceleration and deriving a magnitude of the engine acceleration; (c) third means for setting an ignition timing value according to the detected engine operating condition; (d) fourth means for setting a limit value such that a difference between a previous ignition timing and current ignition timing according to the magnitude of the engine acceleration derived by the second means; (e) fifth means for providing a limit for the current ignition timing value so that the difference is within the limit value and setting the current ignition timing value; (f) sixth means for storing the current ignition timing value as the previous ignition timing value to be used in the fifth means; and (g) seventh means for igniting air-fuel mixture supplied to each engine cylinder at a timing determined by the fifth means.

The above-described object can also be achieved by providing a system for controlling an ignition timing for an internal combustion engine, comprising: (a) first means for detecting an engine operating condition; (b) second means for determining whether the engine in an idling condition falls within a light load condition in a vicinity to the idling condition on the basis of the engine operating condition; (b) third means for detecting an engine acceleration and deriving a magnitude of the engine acceleration when the second means determines that the engine falls within the light load condition; (d) fourth means for setting an ignition timing value according to the detected engine operating condition; (d) fifth means for setting a limit value such that a difference between a previous ignition timing and current ignition timing according to the magnitude of the engine acceleration derived by the third means; (e) sixth means for providing a limit for the current ignition timing value so that the difference is within the limit value and setting the current ignition timing value; (f) seventh means for storing the current ignition timing value as the previous ignition timing value to be used in the fifth means; and (g) eighth means for igniting air-fuel mixture supplied to each engine cylinder at a timing determined by the sixth means.

The above-described object can also be achieved by providing a method for controlling an ignition timing for an internal combustion engine, comprising the steps of: (a) detecting an engine operating condition; (b) detecting whether an engine acceleration exceeding a predetermined threshold value occurs; (c) setting an ignition timing value according to the detected engine operating condition; (d) setting a limit value such that a difference between a previous ignition timing value and a current ignition timing value is limited to the limit value according to the detection result in the step (b); (e) providing a limit for the ignition timing so that the difference is within the limit value and setting the ignition timing angle value; (f) storing the set ignition timing value in the step (e) as the previous ignition timing value; and (g) igniting air-fuel mixture supplied to each engine cylinder at a timing set in the step (e).

DETAILED DESCRIPTION OF THE PREFERRED EMBODIMENT

Reference will hereinafter be made to the drawings in order to facilitate understanding of the present invention.

Figure 1:
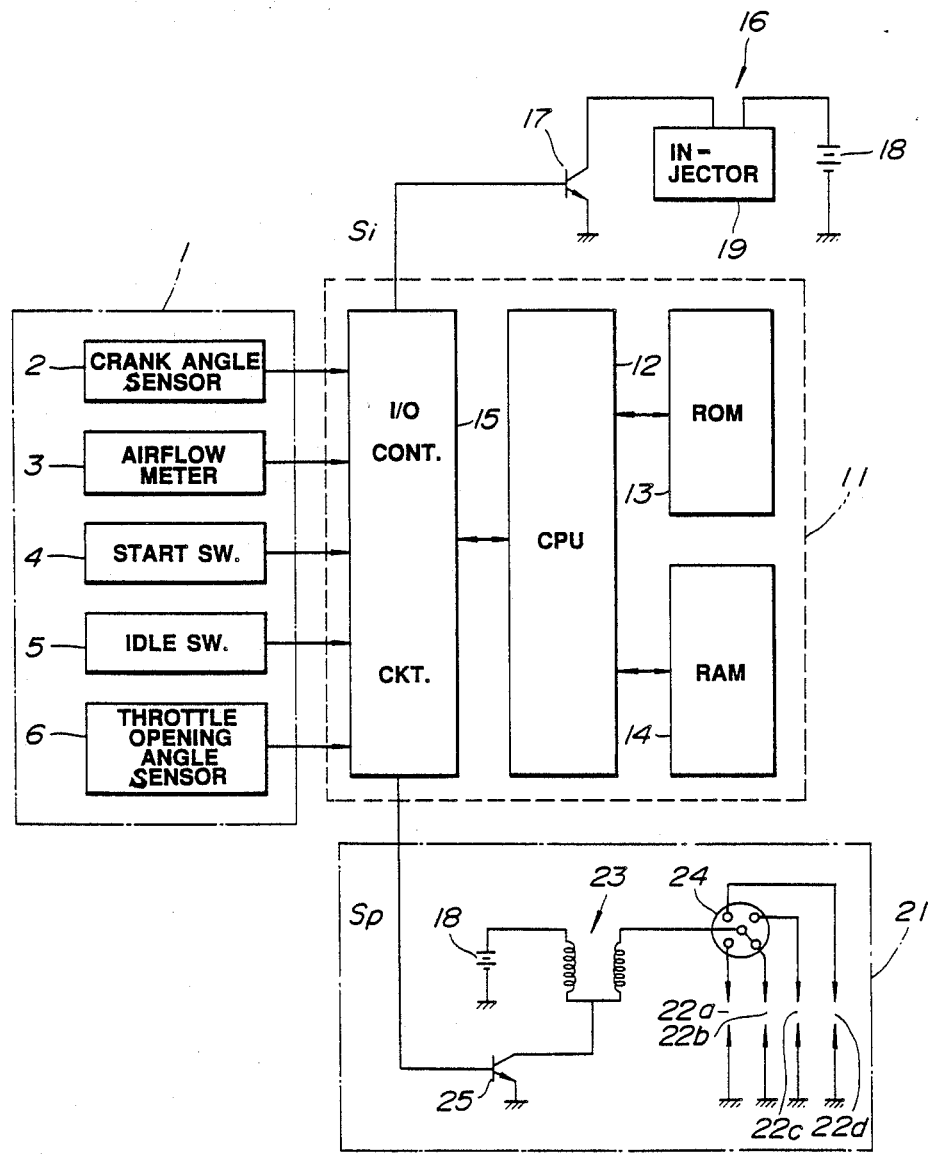
FIG. 1 is a circuit block diagram of a system for controlling an ignition timing for a vehicular engine in a preferred embodiment according to the present invention.

FIG. 1 shows a preferred embodiment of an ignition timing controlling system applicable to a vehicular engine.

In FIG. 1, engine operating condition detector 1 includes a crank angle sensor 2, airflow meter 3, a start switch 4, idling switch 5, and throttle valve opening angle sensor 6. The crank angle sensor 2 outputs a reference position signal $C_a$ which is turned to a high level [H] when a predetermined position, e.g., BTDC (Before Top Dead Center) 70 degrees before a top dead center in a compression stroke of each engine cylinder is reached for each explosion interval (in a case of a six-cylinder engine, 120 degrees in a crank angle and in a case of four-cylinder, 180 degrees in the crank angle) and outputs a unit signal $C_1$ for each unit angle of the crank angle (e.g; 1 degree). It is noted that the number of pulses of the signal $C_a$ are counted to read an engine speed N. The counting operation is carried out by means of a control unit 11 to be described later.

It is noted that the airflow meter 3 measures an intake air quantity $Q_a$ supplied to an engine, the intake air quantity representing an engine load. The start switch 4 is tuned on when the engine is cranked. The on signal from the start switch 4 is supplied to the control unit 11. In addition, the idle switch 5 is turned on when the engine is idle. The on signal from the idle switch 5 is supplied to the control unit 11. The throttle valve opening angle sensor 6 is detects an opening angle TVO of the throttle valve .

The signals from the crank angle sensor 2, airflow meter 3, start switch 4, idle switch 5, and opening angle sensor 6 are inputted to the control unit 11. The control unit 11 includes a CPU (Central Processing Unit) 12, ROM (Read Only Memory) 13, RAM (Random Access memory) 14, and I/O control circuit 15 (having I/O interface, registers, counters, and A/D converter, and so on). The CPU 12 retrieves a required external data via the I/O control circuit 15 carries out the transfer of data with the RAM 14 to process the calculation of required to control the ignition timing, and outputs the data processed according to its necessity.

The I/O control unit 15 receives the signal from the engine operating condition detector 1 and outputs a fuel injector signal $S_i$ and ignition signal $S_p$. The ROM 13 stores an arithmetic operation program to be executed by the CPU 12. The RAM 14 stores data used for the arithmetic operation in a map form. It is noted that a part of the RAM 14 is constituted by, e.g., nonvolatile memory. The contents of storage (learning values and so on) is held after the stop of the arithmetic operation. On the other hand, the injection signal $S_i$ is inputted into a drive circuit 16. The drive circuit 16 includes a fuel injection valve driving transistor 17 and a vehicle battery 18. The drive circuit 16 amplifies the injection signal derived from the I/O control circuit 15 to a level sufficient to inject fuel through the injection valve 19. The fuel injection valve(s) 19 injects fuel in response to the fuel injection signal amplified by the drive circuit 16.

In addition, the ignition signal $S_p$ is supplied from the I/O control circuit 15 to an ignition device 21. The ignition device 21 includes a transistor 25, an ignition coil 23, a distributor 24, spark plugs 22a to 22d, and the vehicle battery 18. The transistor 26 is tuned on or off in response to the ignition signal $S_p$ so as to generate a high surge in a secondary winding of the ignition coil 23. The high surge is supplied to one of the spark plugs 22a to 22d via a distributor 24 so as to ignite and burn air-fuel mixture supplied to the corresponding engine cylinder.

Figure 2:
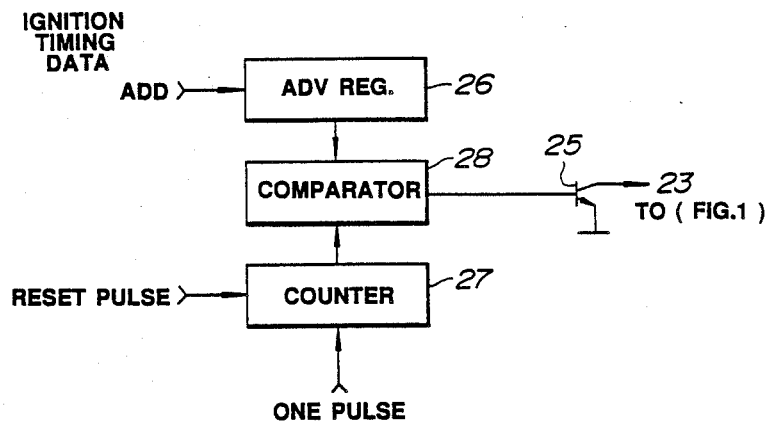
FIG. 2 is a circuit block diagram of an essential part of the ignition timing controlling system shown in FIG. 1.

It is noted that the control of the ignition timing (ON and OFF control of the power transistor 25) is carried out by means of the I/O control circuit 15 including, as shown in FIG. 2, an ADV (advance angle value) register 26 for setting an ignition timing data ADD, a counter 27 for counting the number of the unit angle signal (one degree pulse) $C_1$ derived from the crank angle sensor 2, and a comparator 28 which turns off the power transistor 25 when the ignition timing data ADD set in the ADV register 26 coincides with the count value of the counter 27.

Figure 3:
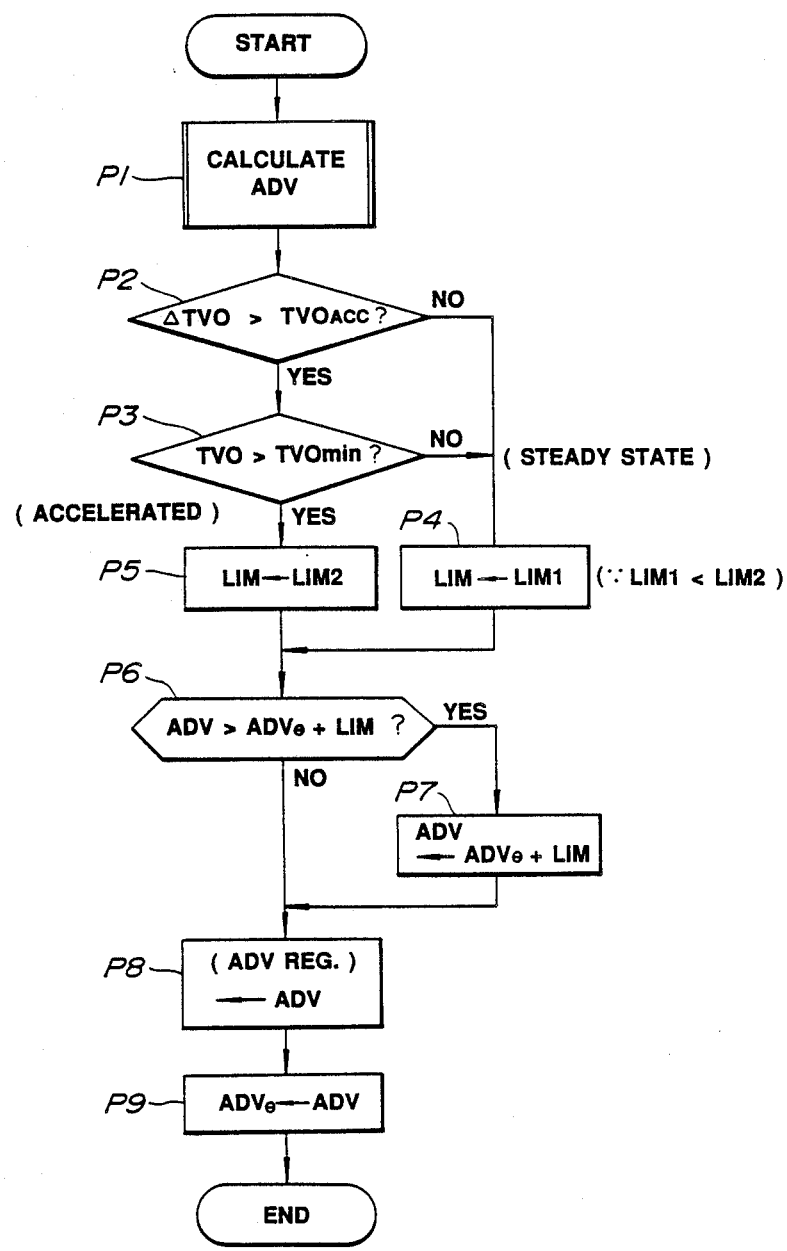
FIG. 3 is an operational flowchart of a program executing the ignition timing control on which the ignition timing controlling system shown in FIG. 1 executes.

It is noted that the data ADD set in the register 26 denotes ADV in a step P8 in FIG. 3 and a reset pulse and one pulse shown in FIG. 3 are derived from the crank angle sensor 2.

Next, an operation of the ignition timing controlling system will be described with reference to FIG. 3.

FIG. 3 shows an operational flowchart, a program of which is stored in the ROM 13.

The program shown in FIG. 3 is executed for each predetermined time.

In a step $P_1$, the CPU 12 calculates an ignition timing ADV on the basis of parameters indicating the engine operating condition. The calculation of the ignition timing ADV is substantially the same as known in the previously proposed ignition controlling system, e.g; disclosed in a Japanese Patent Application First Publication No. sho 60-162059 published on Aug. 23, 1985 and U.S. Pat. No. 4,660,535 issued on Apr. 28, 1987, the contents of the U.S. Patent is hereby incorporated by reference.

In details, when the idle switch 5 is turned on, the ignition timing at the time of the engine idling is determined. When the idle switch 5 is turned off, a normal ignition timing is determined on the basis of a three-dimensional table map stored in the RAM 14 from the engine speed N and intake air quantity Q (engine load) through a table look up technique.

In steps $P_2$ and $P_3$, an engine acceleration condition is detected on the basis of an opening angle value TVO derived from the opening sensor 6.

That is to say, in the step $P_2$, the CPU 12 compares a change rate delta TVO of the opening angle TVO within a constant period of time (a differential value of the throttle opening angle TVO) with a threshold value $TVO_{acc}$ indicating a state in which an accelerator pedal (not shown) linked to the throttle valve is depressed through a predetermined displacement angle. If delta $TVO > TVO_{acc}$, the CPU 12 determines that the depression on the accelerator pedal is abrupt and strong and compares the opening angle TVO with a predetermined threshold value $TVO_{min}$ indicating a angle of depression through the accelerator pedal corresponding to a wide angle of depression.

On the other hand, when delta $TVO \leq TVO_{acc}$, the CPU 12 determines that the engine operating condition indicates a steady state (not transient state) and the routine goes to a step $P_4$. If $TVO \leq TVO_{min}$, the depression through the accelerator pedal is abrupt and strong but the angle displacement of the depression is small so that the engine is not in the predetermined acceleration condition. Then, the routine goes to a step $P_5$.

It is noted that although it is desirable to use the opening angle information TVO of the throttle valve opening angle sensor 6 since it is a fastest information to recognize the predetermined engine acceleration condition, the intake air quantity information $Q_a$ from the airflow meter 3 may be used (although the speed of response is slow as compared with the opening angle information TVO of the opening angle sensor 6).

When the CPU 12 determines that the engine operating condition is in the steady state, an ignition timing angle limit value LIM is set to a small value LIM 1 (for example, four degrees) in the step $P_4$. When the engine is in the predetermined acceleration state, the ignition timing limit value LIM is set to a larger value LIM 2 (for example, 15 degrees) than the above-described limit value LIM 1.

It is noted that in the preferred embodiment, the ignition timing limit value LIM is set to two values depending on whether the engine is in the steady state or in the predetermined acceleration state. However, a plurality of values may be set according to a magnitude of the acceleration.

For example, the CPU 12 may calculate the limit value LIM 2 in accordance with the following calculation equation (1).

$$\text{LIM } 2 = \text{delta TVO} \times a \quad (1)$$

In the equation (1), a denotes a proportional constant.

In a step $P_6$, the CPU 12 compares the current ignition timing angle value ADV with a previous ignition timing angle value $ADV_\theta$ stored in the previous processing routine (before the predetermined time) to which the limit value LIM derived in the step $P_4$ or $P_5$ ($ADV_\theta + LIM$) is added.

If $ADV > ADV_\theta + LIM$, the CPU 12 determines that difference between the previous ignition timing $ADV_\theta$ and the current ignition timing angle ADV exceeds the limit value LIM. Then, the routine goes to a step $P_7$ in which the current ignition timing angle ADV is the previous ignition timing angle $ADV_\theta$ to which the limit value LIM is added. On the other hand, if $ADV \leq ADV_\theta + LIM$, the CPU 12 determines that the difference between the previous ignition timing angle $ADV_\theta$ and current ignition timing angle ADV is within the limit value LIM and the routine goes to a step $P_8$. In the step $P_8$, the current ignition timing angle value ADV is set in the ADV register 26 in the I/O control circuit 15. In a step $P_9$, the ignition timing angle value ADV is stored in a predetermined memory location $ADV_\theta$ as the previous ignition timing value and the current processing routine is ended.

Figure 4:
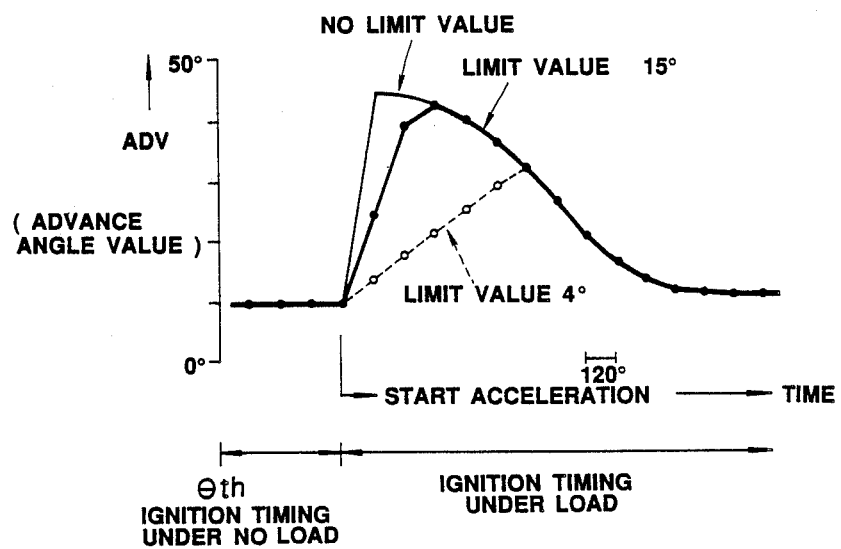
FIG. 4 is a characteristic graph of the ignition control executed in FIG. 1.

In the way described above, the engine acceleration condition is detected on the basis of, e.g., opening angle value TVO of the throttle valve. A limit value LIM is set which limits the difference between the current ignition timing angle and previous ignition timing angle. That is to say, when the abrupt acceleration condition is detected form the change rate of the opening angle denoted by delta TVO, the limit value LIM is set to a large angle value (15 degrees) as shown in a solid line of FIG. 4 so that the ignition timing immediately follows the change in the engine load. When the engine is in the steady state, the limit value of the ignition timing is set to a low value (4 degrees) as in the previously proposed ignition timing controlling system.

Hence, the abrupt change in the engine output torque due to the abrupt change in the ignition timing can be prevented and the ignition timing can be set so as not to provide a response delay for a rise of the engine torque during the engine acceleration. Consequently, a favorable driveability can be achieved.

As described hereinabove, in the ignition timing controlling system and method according to the present invention, the limit value limiting the difference between the previous ignition timing and current ignition timing is set according to the acceleration condition. Therefore, the abrupt change in the engine output torque due to the abrupt change in the ignition timing can be prevented without deterioration of the response characteristic of the rise in the engine output torque during the engine acceleration. Consequently, the driveability and steering operability of the vehicle can be improved.

It will fully be appreciated by those skilled in the art that the foregoing description is made in terms of the preferred embodiment and various changes and modifications may be made without departing from the scope of the present invention which is to be defined by the appended claims.

What is claimed is:

1. A system for controlling an ignition timing for an internal combustion engine, comprising:
    (a) first means for detecting an engine operating condition;
    (b) second means for detecting whether an engine acceleration exceeding a predetermined value occurs;
    (c) third means for setting an ignition timing value according to the detected engine operating condition;
    (d) fourth means for setting a limit value to limit a difference between a current ignition timing value and a previous ignition timing value according to a result of detection by means of the second means;
    (e) fifth means for providing a limit for the current ignition timing value so that the difference is within the limit value and setting the current ignition timing value;
    (f) sixth means for storing the current ignition timing value set by the fifth means therein as the previous ignition timing value; and
    (g) seventh means for igniting air-fuel mixture supplied to each engine cylinder at a timing whose value is determined by the fifth means.

2. A system as set forth in claim 1, wherein the fourth means sets a first limit value as the set limit value when the third means detects that the engine acceleration exceeding the predetermined value occurs and sets a second limit value as the set limit value when the engine acceleration exceeding the predetermined value does not occur.

3. A system as set forth in claim 2, wherein the first limit value is larger than the second limit value.

4. A system as set forth in claim 3, wherein the first limit value is 15 degrees in a crank angle and second limit value is 4 degrees in the crank angle.

5. A system as set forth in claim 1, wherein the third means detects the engine acceleration exceeding the predetermined value on the basis of a change rate of an opening angle of an engine throttle valve.

6. A system as set forth in claim 5, wherein the third means detects the engine acceleration exceeding the predetermined value in such a way that the change rate of the opening angle of the throttle valve with time exceeds a threshold value and the current opening angle of the throttle valve with respect to a fully closed position exceeds a minimum opening angle for determining an abrupt acceleration of the engine.

7. A system as set forth in claim 1, wherein the third means detects the engine acceleration exceeding the predetermined value on the basis of a change rate of air flow in an intake air passage in the engine.

8. A system as set forth in claim 1, which further comprises eighth means for determining a magnitude of the engine acceleration on the basis of the detection result of the third means and wherein the fourth means sets the limit value according to the magnitude of the engine acceleration detected by the eight means.

9. A system for controlling an ignition timing for an internal combustion engine, comprising:
    (a) first means for detecting an engine operating condition;
    (b) second means for detecting an engine acceleration and deriving a magnitude of the engine acceleration;
    (c) third means for setting an ignition timing value according to the detected engine operating condition;
    (d) fourth means for setting a limit value such that a difference between a previous ignition timing and current ignition timing according to the magnitude of the engine acceleration derived by the second means;
    (e) fifth means for providing a limit for the current ignition timing value so that the difference is within the limit value and setting the current ignition timing value;
    (f) sixth means for storing the current ignition timing value as the previous ignition timing value to be used in the fifth means; and
    (g) seventh means for igniting air fuel mixture supplied to each engine cylinder at a timing determined by the fifth means.

10. A system as set forth in claim 9, wherein the set limit value becomes larger as the magnitude of the engine acceleration becomes large.

11. A system as set forth in claim 9, wherein the second means detects the magnitude of the acceleration from a change rate of an opening angle in a positive direction of an engine throttle valve and the fourth means calculates such an equation as the value of the change rate multiplied by a proportional constant to set the limit value.

12. A system for controlling an ignition timing for an internal combustion engine, comprising:
    (a) first means for detecting an engine operating condition;
    (b) second means for determining whether the engine in an idling condition falls within a light load condition in a vicinity to the idling condition on the basis of the engine operating condition;
    (c) third means for detecting an engine acceleration and deriving a magnitude of the engine acceleration when the second means determines that the engine falls within the light load condition;
    (d) fourth means for setting an ignition timing value according to the detected engine operating condition;
    (e) fifth means for setting a limit value such that a difference between a previous ignition timing and current ignition timing according to the magnitude of the engine acceleration derived by the third means;

(f) sixth means for providing a limit for the current ignition timing value so that the difference is within the limit value and setting the current ignition timing value;

(g) seventh means for storing the current ignition timing value as the previous ignition timing value to be used in the fifth means; and (h) eighth means for igniting air-fuel mixture supplied to each engine cylinder at a timing determined by the sixth means.

13. A method for controlling an ignition timing for an internal combustion engine, comprising the steps of:

(a) detecting an engine operating condition;

(b) detecting whether an engine acceleration exceeding a predetermined threshold value occurs;

(c) setting an ignition timing value according to the detected engine operating condition;

(d) setting a limit value such that a difference between a previous ignition timing value and a current ignition timing value is limited to the limit value according to the detection result in the step (b);

(e) providing a limit for the ignition timing so that the difference is within the limit value and setting the ignition timing angle value;

(f) storing the set ignition timing value in the step (e) as the previous ignition timing value; and (g) igniting air-fuel mixture supplied to each engine cylinder at a timing set in the step (e).

* * * * *